United States Patent
Lavelle et al.

(10) Patent No.: US 6,864,892 B2
(45) Date of Patent: Mar. 8, 2005

(54) GRAPHICS DATA SYNCHRONIZATION WITH MULTIPLE DATA PATHS IN A GRAPHICS ACCELERATOR

(75) Inventors: Michael G. Lavelle, Saratoga, CA (US); Brian D. Emberling, San Mateo, CA (US); David C. Kehlet, Los Altos, CA (US); Thomas W. Bowman, Beaverton, OR (US)

(73) Assignee: Sun Microsystems, Inc., Santa Clara, CA (US)

( * ) Notice: Subject to any disclaimer, the term of this patent is extended or adjusted under 35 U.S.C. 154(b) by 288 days.

(21) Appl. No.: 10/093,835

(22) Filed: Mar. 8, 2002

(65) Prior Publication Data

US 2003/0169259 A1 Sep. 11, 2003

(51) Int. Cl.[7] ............................................. G06F 15/16
(52) U.S. Cl. ...................... 345/503; 345/506; 345/520; 345/582
(58) Field of Search .............................. 345/503, 506, 345/519, 520, 531, 552, 556, 559, 502

(56) References Cited

U.S. PATENT DOCUMENTS

| | | | |
|---|---|---|---|
| 5,307,449 A | | 4/1994 | Kelley et al. |
| 5,517,603 A | * | 5/1996 | Kelley et al. .................. 345/426 |
| 5,594,854 A | | 1/1997 | Baldwin et al. |
| 5,751,292 A | * | 5/1998 | Emmot ........................ 345/587 |
| 5,761,439 A | | 6/1998 | Kar et al. |
| 5,796,413 A | * | 8/1998 | Shipp et al. .................. 345/522 |
| 5,821,950 A | * | 10/1998 | Rentschler et al. ........... 345/505 |
| 5,917,503 A | * | 6/1999 | Zakharia et al. .............. 345/506 |
| 6,020,901 A | * | 2/2000 | Lavelle et al. ................ 345/545 |
| 6,047,334 A | * | 4/2000 | Langendorf et al. ............. 710/5 |
| 6,252,610 B1 | * | 6/2001 | Hussain ........................ 345/506 |
| 6,628,288 B1 | * | 9/2003 | Potter et al. .................. 345/502 |
| 6,636,214 B1 | * | 10/2003 | Leather et al. ................ 345/422 |

* cited by examiner

Primary Examiner—Ulka J. Chauhan
(74) Attorney, Agent, or Firm—Meyertons Hood Kivlin Kowert & Goetzel, P.C.; Jeffrey C. Hood; Mark K. Brightwell

(57) ABSTRACT

A system and method for preserving the order of data items through a divergence-and-reconvergence of two or more paths in a hardware device. A host processor may write a first token to a first path in the hardware device. A convergence unit in the hardware device may receive and store the first token in a synchronization register. The host processor may poll the synchronization register to determine when the first token arrives in the synchronization register. In response to determining that the first token has arrived in the synchronization register, the host processor may safely write a sequence of one or more data items to a second path in the hardware device.

12 Claims, 10 Drawing Sheets

GRAPHICS DATA SYNCHRONIZATION WITH MULTIPLE DATA PATHS IN A GRAPHICS ACCELERATOR

BACKGROUND OF THE INVENTION

1. Field of the Invention

This invention relates generally to the field of pipelined computation and, more particularly, to a protocol and corresponding hardware mechanism for guaranteeing a proper ordering of data processed and/or transmitted through separate paths in a hardware device.

2. Description of the Related Art

A host computer may send data (e.g. graphics data) to a hardware device (e.g. a graphics accelerator). The hardware device may include a system of processing units. The processing units may be organized into paths or pipelines. Some of the paths may diverge. Thus, the data items received by the hardware device may get sent down different paths (e.g. some data items going down one path, and other data items going down another path and so on). At some point, the paths may merge (i.e. rejoin). Because the different paths may have different latencies, the stream of data items may have a different order after the merge point than prior to diverging. This disturbance of ordering may have adverse effects on system performance (e.g. the visual quality of the video output generated by a hardware accelerator).

One possible mechanism for preserving the order of data items after the merge point (relative to the order they had prior to the point of divergence of the paths) may be referred to as "waiting for idle". The host software may (a) write an attribute appropriate for a first data item targeted for a first path, (b) write the first data item, and (c) poll a "busy" bit. When the hardware device is not busy (i.e. idle), the host computer may change attributes, i.e. may write a second attribute value appropriate for a second data item targeted for a second path.

Each processing element in a path may generate a status bit which indicates whether it is busy or idle. It may require complex logic to ensure that a path always reports busy whenever any data is in transit anywhere in the path. This complex logic may cause timing problems that limit performance. The status bit of each processing unit in a path may have a logical OR connection with a centralized busy reporting register. These connections to the centralized register take up chip space (or board space) which could have been used for other purposes. Thus, the "waiting for idle" method is inefficient. Therefore, there exists a need for a more efficient mechanism of preserving the order of data items after a data merge point in a hardware device (relative to the order the data items had prior to a point of divergence).

SUMMARY OF THE INVENTION

In one set of embodiments, a method for preserving the order of data items through a divergence-and-reconvergence of two or more paths in a hardware device may be arranged as follows. A host processor may write a first token to a first path in the hardware device. A convergence unit in the hardware device may receive and store the first token in a synchronization register. The host processor may poll the synchronization register to determine when the first token arrives in the synchronization register. In response to determining that the first token has arrived in the synchronization register, the host processor may write a sequence of one or more data items to a second path in the hardware device.

In another set of embodiments, a hardware device supporting an order preservation protocol may be configured as follows. The hardware device may include a first path, a second path, and a convergence unit where the two paths merge. The convergence unit is configured to receive output data from the first path and second path. Furthermore, the convergence unit is configured to identify any token in the output data from the first path and second path, and to store the token in a synchronization register. The synchronization register is readable by an external device such as a host processor.

The hardware device may include a bus interface for receiving data items from the external device. The bus interface may be configured to send each of the data items to the first path or the second path.

In yet another set of embodiments, a graphics system may be configured as follows. The graphics system may include a raster pipe and a direct path. The raster pipe may be configured to operate on geometry data to generate samples, and the direct path may be configured to operate on pixel data. The convergence unit may be configured to merge a first data stream including samples from the raster pipe and a second data stream including the pixel data from the direct path, and to forward the merged data stream to a frame buffer. The convergence unit may be further configured to identify an occurrence of a token in the merged data stream and to store the token in a synchronization register. The synchronization register is readable by an external device such as a host processor.

In yet another set of embodiments, software writes some value to a first pipe. The software then polls (i.e. reads) the synchronization register until the expected value appears in the synchronization register. (The value propagates through the first pipe to the synchronization register.) The appearance of the expected value in the synchronization register implies that the register.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
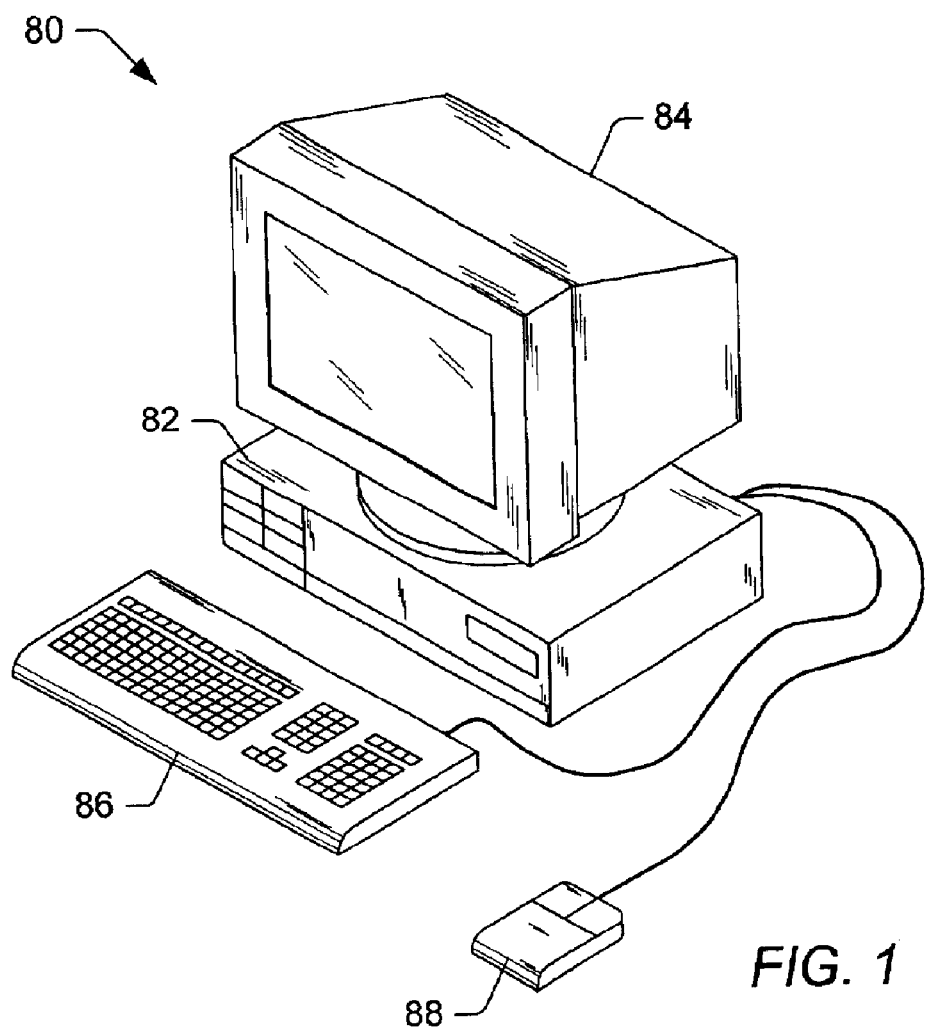
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
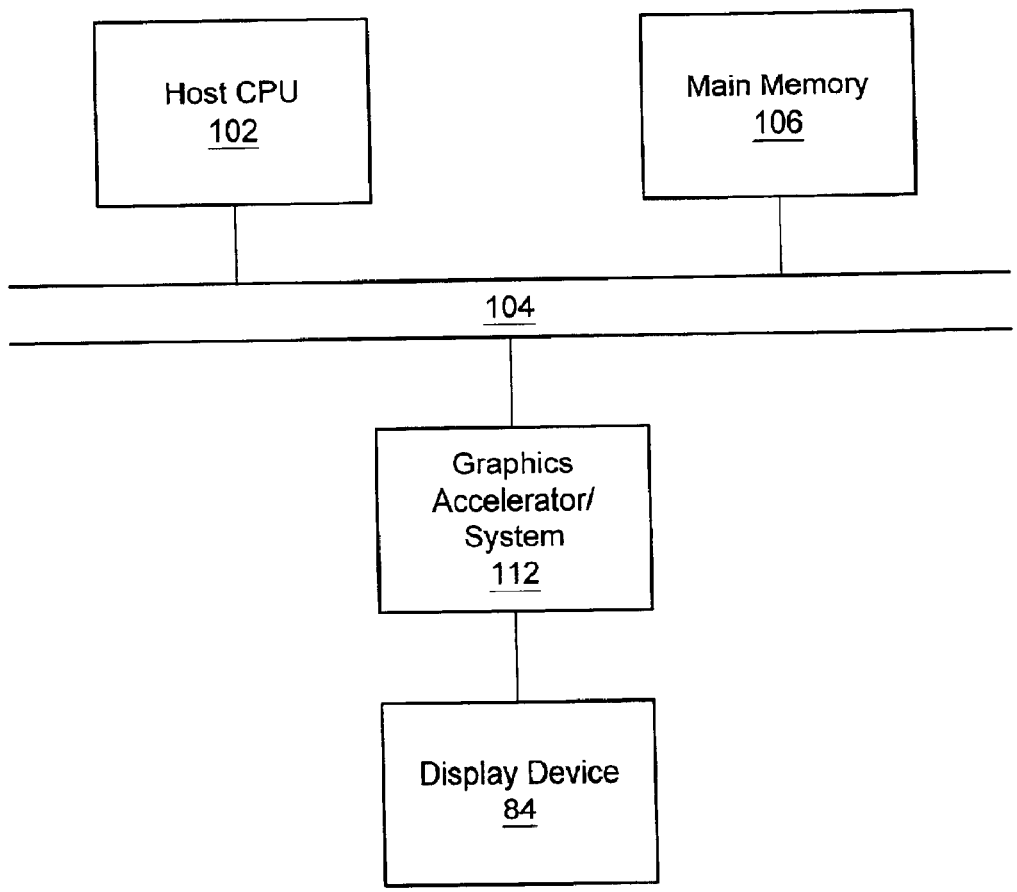
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
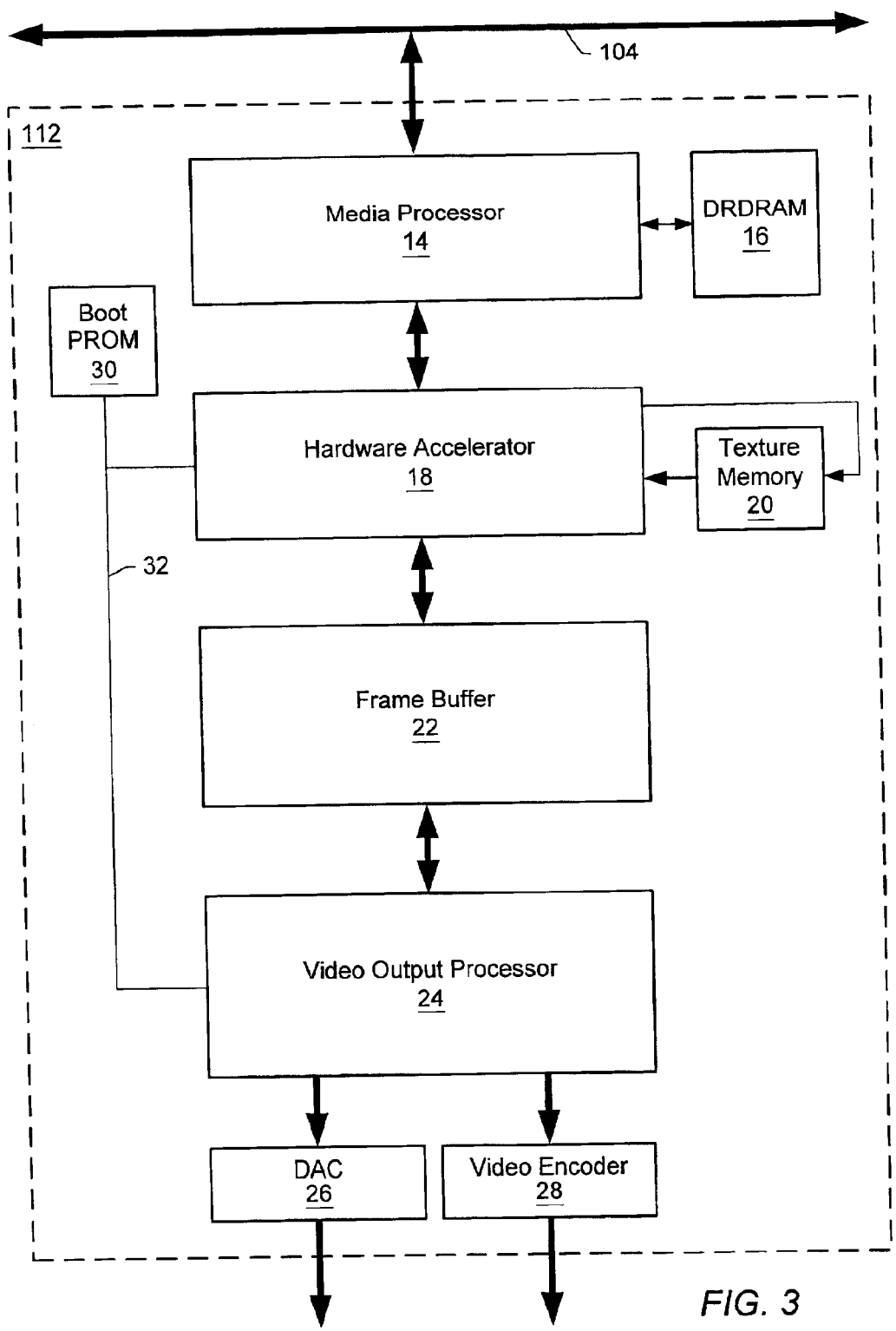
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
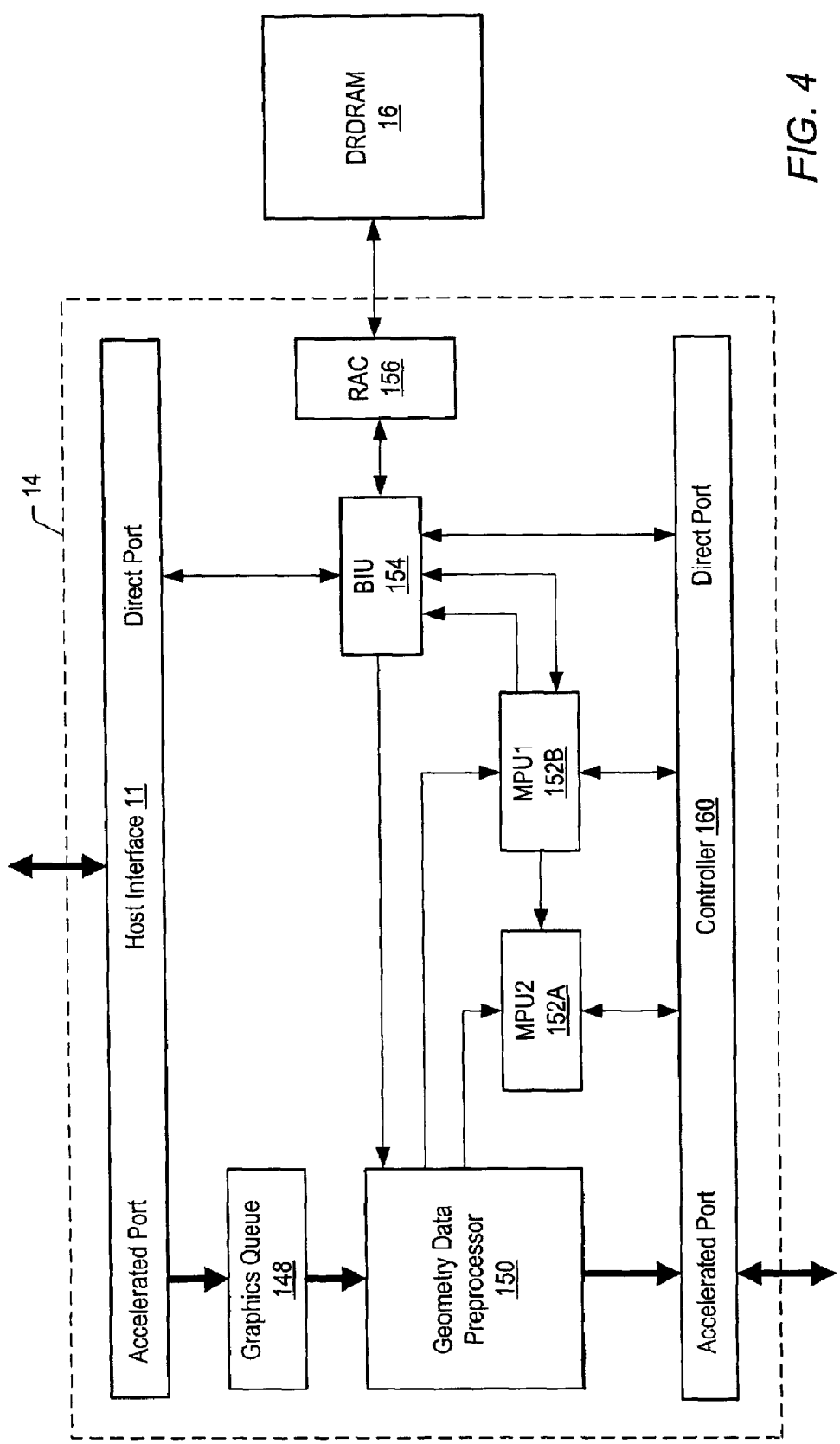
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
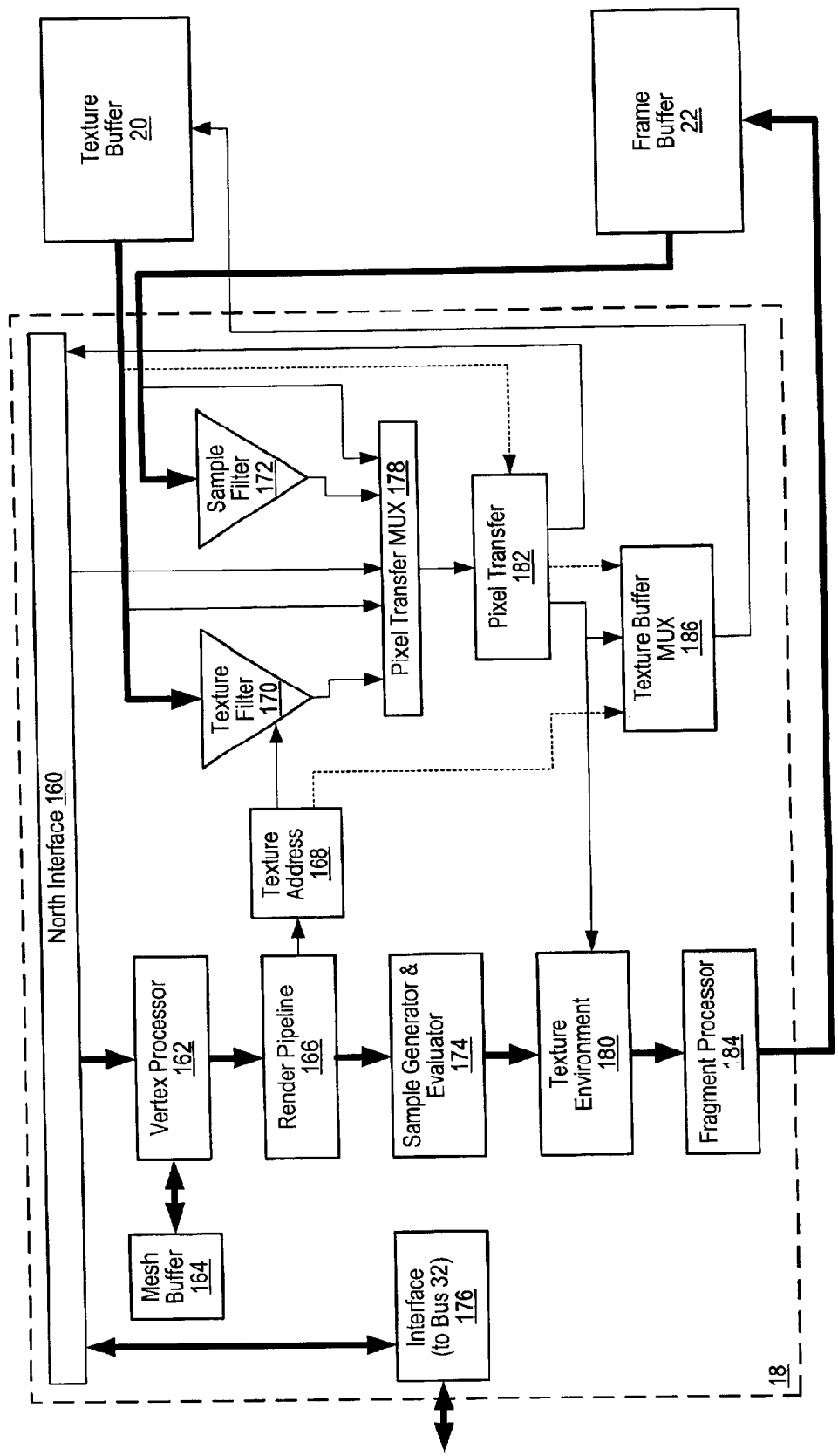
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using super-sampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
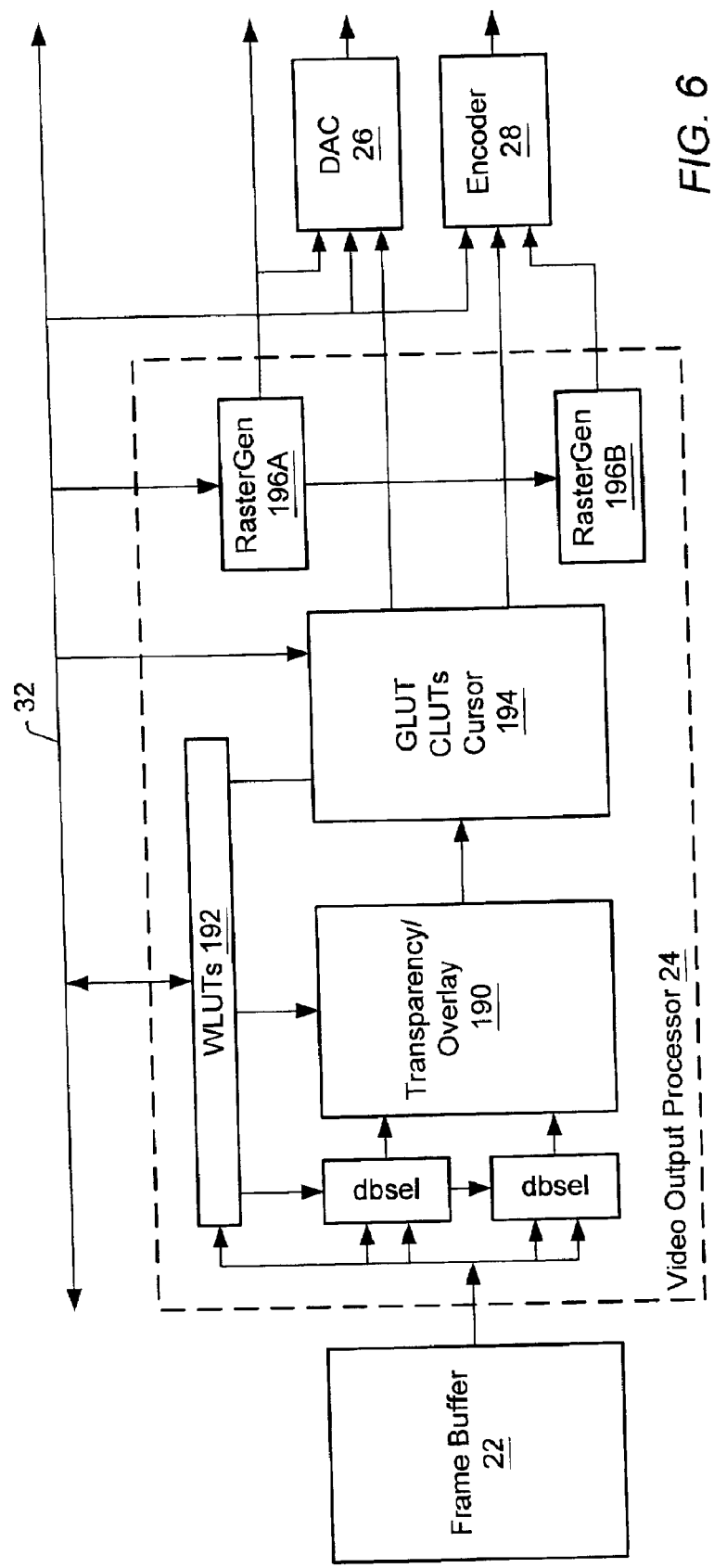
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
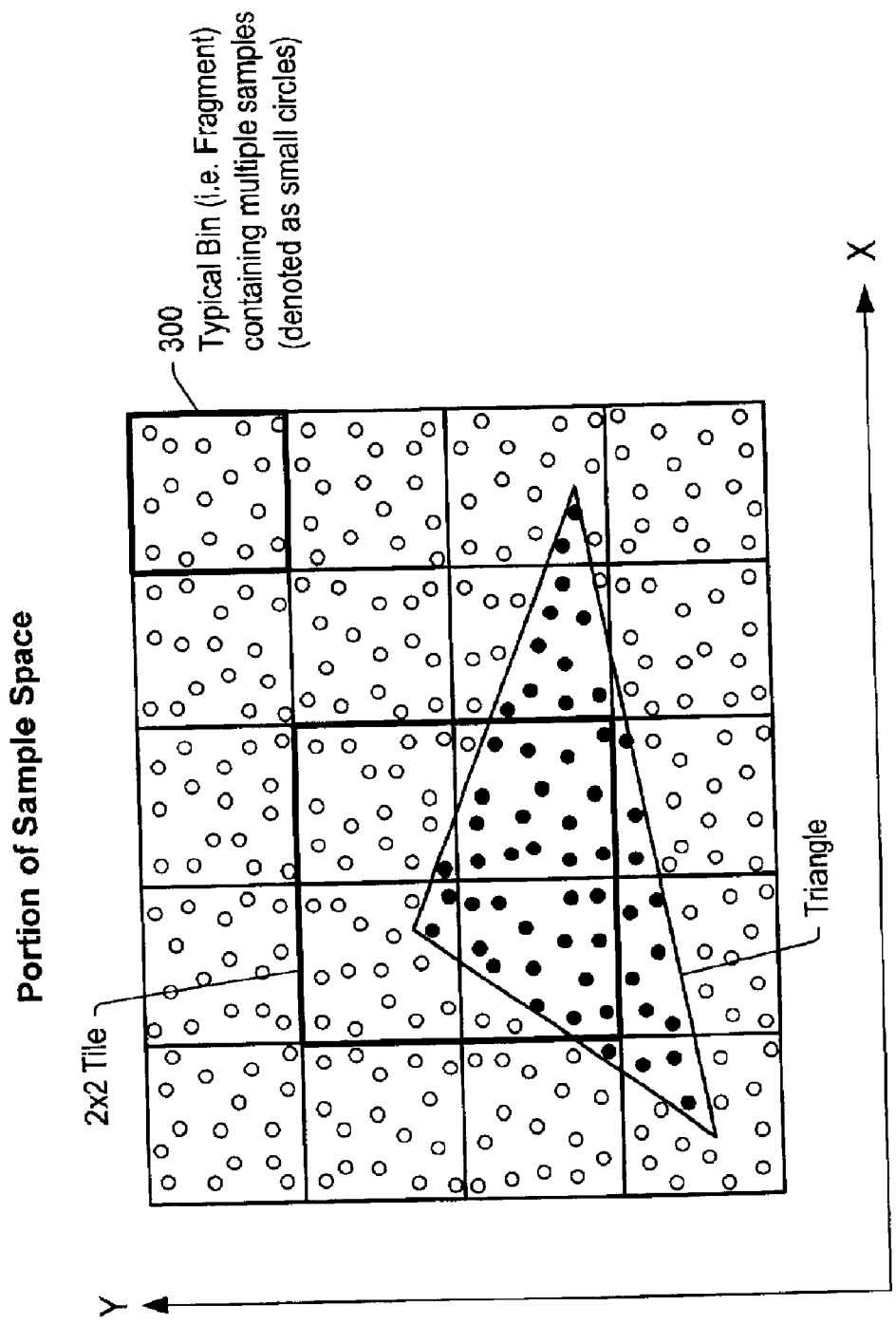
FIG. 7 is an illustration of a sample space partitioned into an array of bins.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins as illustrated in FIG. 7. Each bin may contain one or more samples. The number of samples per bin may be a programmable parameter.

Data Synchronization Mechanism

Figure 8:
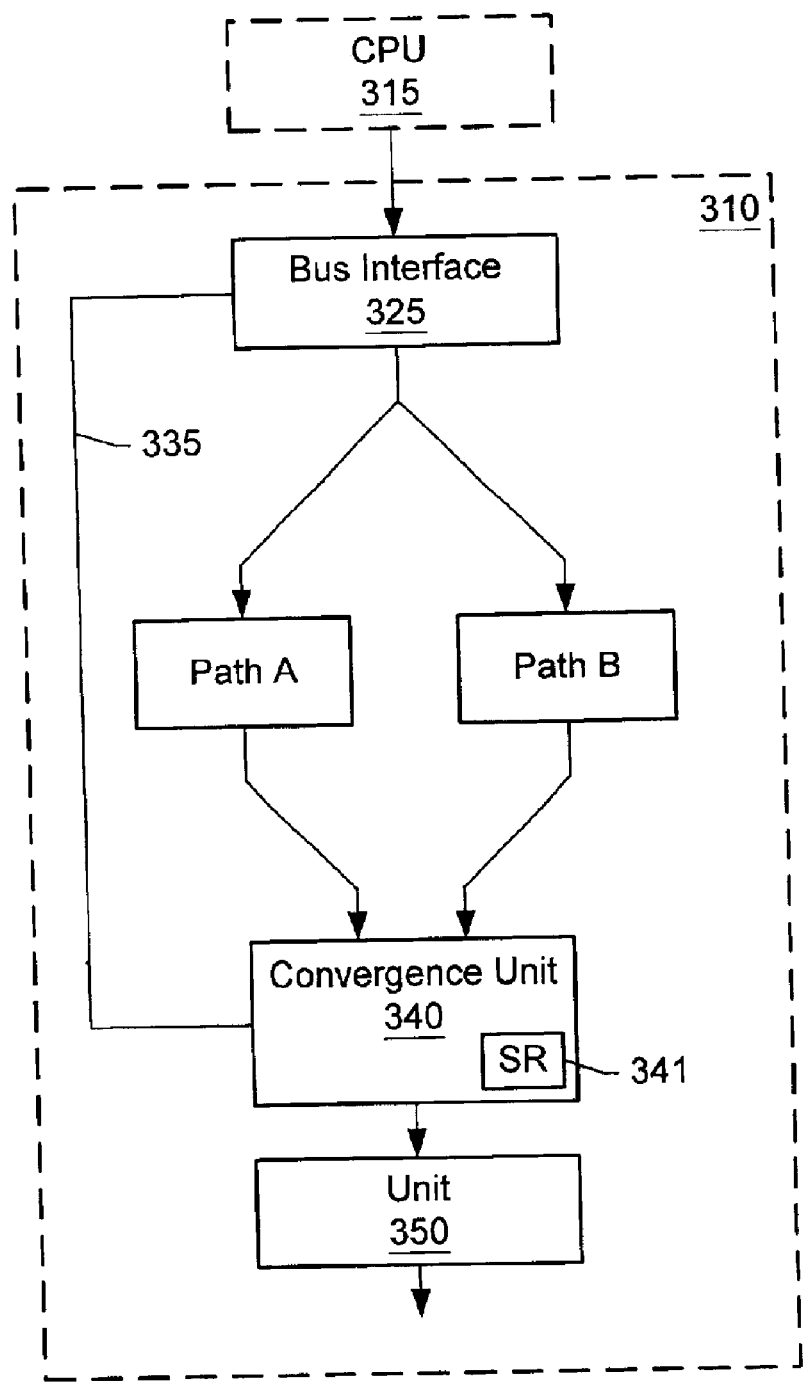
FIG. 8 illustrates one embodiment of a hardware device which performs processing operations for a host CPU 315.

A central processing unit 315 (e.g. host processor 102) may send a stream of data items to a hardware device 310 as suggested by FIG. 8. The data items may flow through two or more different paths (e.g. PathA and PathB) in the hardware device 310. The two or more paths may meet at (i.e. send their output to) a convergence unit 340. At the convergence unit 340, the streams of data from each of the two or more paths may merge. The merged stream may be forwarded to other units such as unit 350. (Unit 350 may be a processing unit and/or a storage unit). For any of various reasons, there may be a motivation for preserving the order of the data items arriving at unit 350 relative to the order of transmission of the data items from CPU 315 to hardware device 310.

It is noted that data items may get modified, transformed, pruned, augmented or fragmented in the processing units along a path. For example, a path may be a computational pipeline. Thus, a data item may have different representations at different points along a path.

The hardware device 310 may include a bus interface 325 for communicating with the central processing unit 315.

In one set of embodiments, the hardware device 310 may support a protocol for guaranteeing the preservation of order of the data items arriving at the unit 350 with respect to the original order of assertion of those data items to the hardware device 310. The order-preservation protocol may be supported by supplying a host-readable register in the convergence unit 340. This host-readable register is referred to herein as the synchronization register 341. There may be a communication bus 335 (directly or indirectly) coupling the bus interface unit 325 to convergence unit 340 so that the contents of the synchronization register may be reported to the central processing unit 315 in an efficient fashion.

Figure 9:
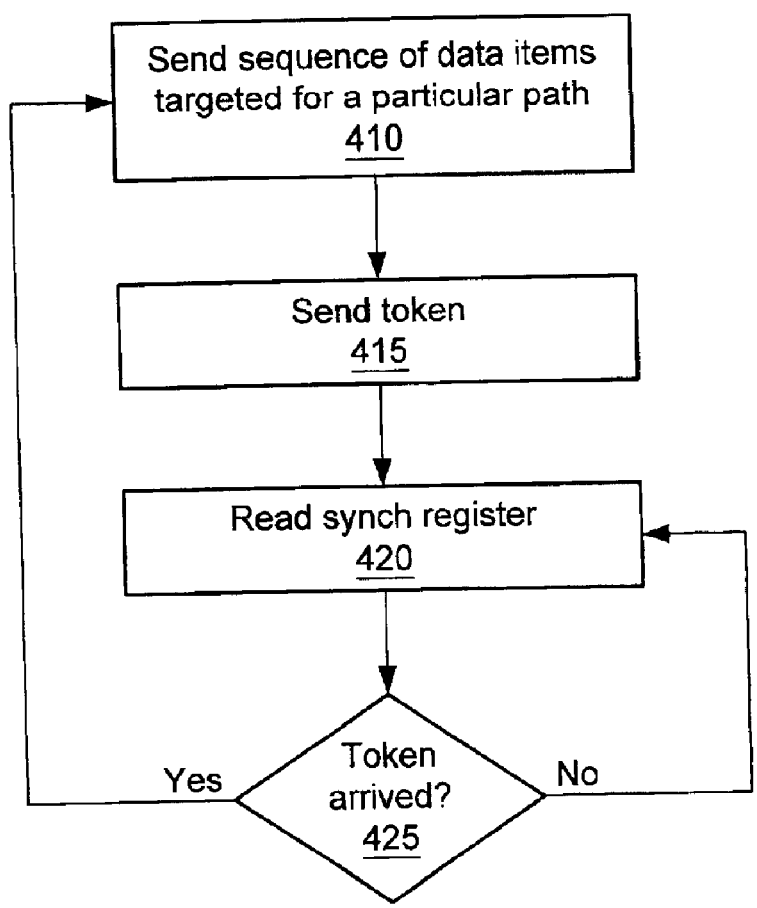
FIG. 9 illustrates one embodiment of a method for preserving the order of data items after a merge point of different paths in a hardware device relative to an ordering the data items had prior to diverging along the different paths.

The order preservation protocol may operate as indicated in FIG. 9. In step 410, the CPU 315 may send a first sequence of one or more data items targeted for a given path (e.g. PathA) to the hardware device 310.

At the end of the first sequence of data items, the CPU 315 sends a token to the hardware device 310 as indicated in step 415. The token follows the first sequence of data items through PathA to the convergence unit 340.

The convergence unit 340 may receive a stream of data items from each of the two or more paths as indicated above. Convergence unit 340 may be configured to detect the occurrence of a token in any of the received data streams, and store the token in the synchronization register 341. In one set of embodiments, convergence unit 340 may merge the receive data streams (e.g. into a merge buffer), examine the merged data stream to detect an occurrences of a token, and store the token in the synchronization register 341.

After sending the token, the CPU 315 may start to poll the synchronization register 341 to determine when the token has arrived at the synchronization register 341 as indicated in steps 420 and 425.

The arrival of the token at the synchronization register indicates that the first sequence of data items has cleared the PathA. Thus, the CPU 315 may safely initiate the transmission of a second sequence of data items targeted for any other path (e.g. PathB), or, for the same path (i.e. PathA in this example), in response to detecting the arrival of the token at the synchronization register. In other words, CPU 315 may return to step 410 in response to detecting the arrival of the token in the synchronization register.

Thus, software and hardware may cooperate to perform a synchronization protocol whenever data ordering across multiple paths is required.

In some embodiments, the CPU 315 (running under program control) may implement a timeout mechanism for the polling of the synchronization register 341. Thus, in the event of a fault in hardware device 310 or a programming protocol violation, CPU 315 will not wait forever polling the synchronization register. After a period of time that is programmable by software, the CPU 315 may quit polling for the expected token. In this event, software may perform diagnostics or print debugging information to aid in the identification of the protocol or hardware problem.

In one set of embodiments, the hardware device 310 may be a graphics system such as graphics system 112 or a rendering chip such as hardware accelerator 18, and CPU 315 may be the host processor 102.

Figure 10:
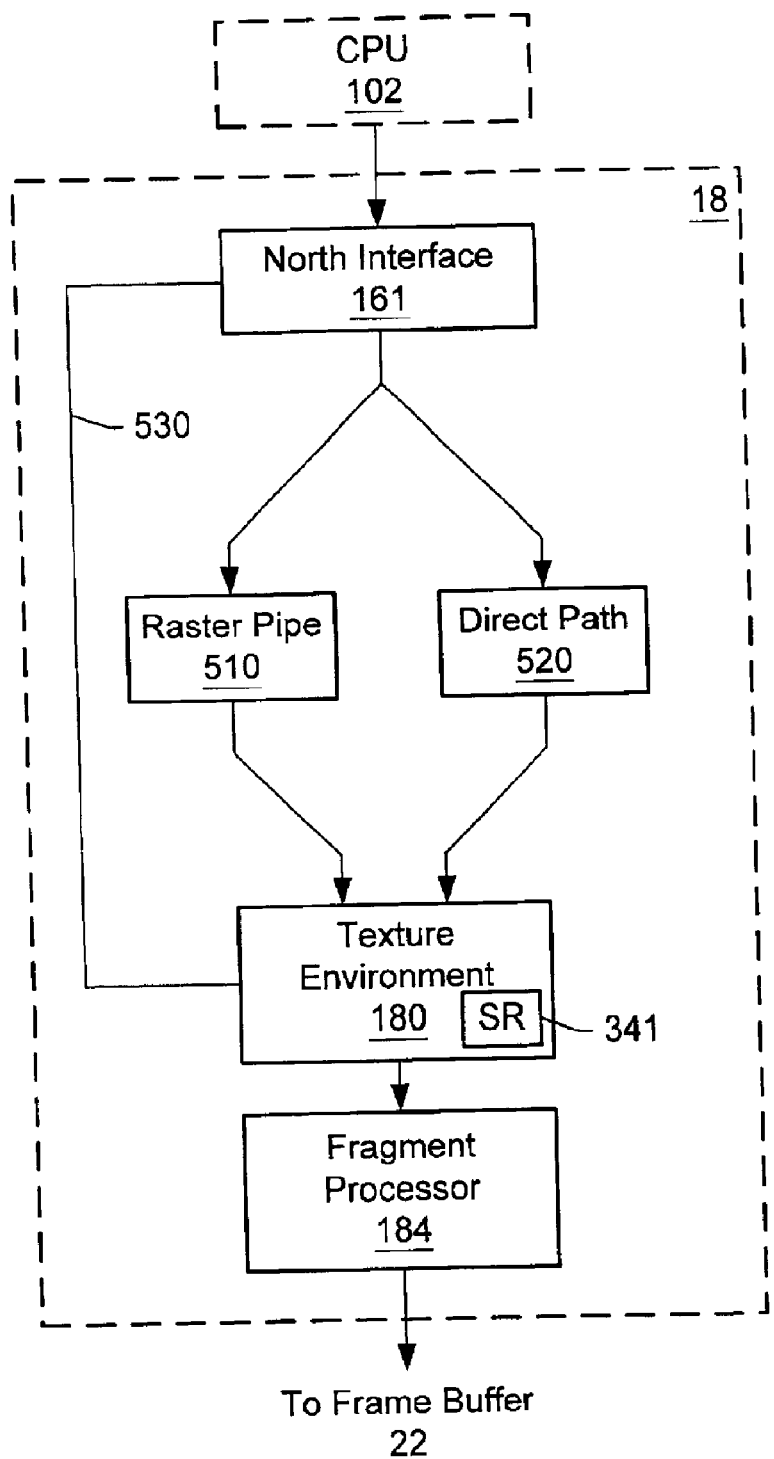
FIG. 10 illustrates one embodiment of hardware accelerator 18 which highlights a raster pipe and a direct path which diverge and then converge at texture environment 180.

FIG. 10 illustrates one set of embodiments of hardware accelerator 18. Hardware accelerator 18 may receive both geometry data and pixel data from the host CPU 102 (e.g. through media processor 14). The geometry data may define primitives such as triangles. The geometry data may be sent through a raster pipe 510. The pixel data 520 may be sent through a direct path 520.

The raster pipe 510 may include vertex processor 162, render pipeline 166, and sample generator and evaluator 174. The direct path may include pixel transfer MUX 178 and pixel transfer unit 182. Texture environment 180 may serve in the role of convergence unit, i.e. texture environment 180 may store the synchronization register 341. Texture environment 180 may couple to north interface 161 through a bus 530. Host CPU 102 may read the synchronization register through north interface 161 and bus 530.

The direct path 520 may be a lower latency path than the raster pipe 510. Thus, without some mechanism to maintain data ordering, there may be the possibility that the initial ordering of data that gets split down the two paths 510 and 520 may be disturbed by the time the data rejoins at texture environment 180.

Suppose that a graphics scene includes both geometry data and pixel data in a computer's main memory (e.g. main memory 106). Furthermore, suppose the different types of data are associated with different sets of attributes (such as blending factors). The geometry data may correspond to one blending factor, and the pixel data may correspond to a different blending factor. In some embodiments of hardware accelerator 18, both (a) the pixel data and (b) the rendered samples generated in response to the geometry data in the raster pipe 510 may use the same blending hardware. The blending hardware may occur after the convergence point, i.e. after the texture environment 180. For example, the blending hardware may be located in the frame buffer 22. Thus, it may be important to preserve the original reception order of data items arriving at the blending hardware. The original reception order may be defined as the order in which the data items are received at north interface 161 from CPU 102.

A token may be sent at the end of a sequence of data traveling down a path. Hardware (e.g. texture environment 180) at the path join point collects tokens sent down all paths joining at that point. The hardware saves the most recent token in the synchronization register. The synchronization register is readable by host software, Sending the token down a path is called "writing to the synchronization register". In one set of embodiments, the tokens may be assigned values that correspond to the path the token takes. Since the token follows the data down a path, software may read the synchronization register to determine if the data sent down that path has completely transited the join point.

Host software may first initialize the synchronization register to a known value. Suppose the host software wishes to use the graphics processing of the raster pipe 510. Before sending data down the raster pipe 510, the host software may send a token down the direct path 520 to the synchronization register. Suppose the token is assigned the value X. The software polls the synchronization register until the value X is read. In response to detecting the value X in the synchronization register, the host software may write attributes and data to the raster pipe 510 (including attributes meant for processing hardware past the join point of raster pipe 510 and the direct path 520).

Next, suppose the software wants to use the processing of the direct path 520 as part of composing the desired graphics image. The software writes a token with the value Y down the raster pipe 510. The software polls the synchronization register until the value Y is read. In response to reading the value Y, the software may safely send data and attributes down the direct path 520.

In some embodiments, the software may send a first sequence of one or more data items to a given path followed by a first token, and then send a second set of one or more data items to the same path followed by a second token. In other words, it is not necessary for the software to switch to a different path after having sent a token for a first path. The successive tokens sent down the first path may have different values since the host software will be interested in whether or not the last set of data it sent to the first path has cleared the first pipe.

The various embodiments described herein may be used to ensure that the correct attributes are applied as intended to each part of the data at processing units or storage units in or downstream from the convergence unit (e.g. the texture environment 180 of hardware accelerator 18, or frame buffer 22).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A hardware device comprising:
   a first path and a second path;
   a convergence unit coupled to receive output data from the first path and second path;
   wherein the convergence unit is configured to identify a token in the output data from the first path and second path, and to store the token in a synchronization register;
   wherein the synchronization register is readable by an external devices
   wherein the hardware device further comprises a bus interface for receiving data items from a host processor, wherein the bus interface is configured to send each of the data items to the first path or the second path;
   wherein the convergence unit couples to the bus interface through a bus, wherein the host processor may read the synchronization register through the bus.

2. The hardware device of claim 1, wherein the external device is a host processor.

3. The hardware device of claim 1, wherein the first path is a raster pipe.

4. The hardware device of claim 1, wherein the second path is direct path for pixel data.

5. The hardware device of claim 1, wherein the hardware device is a hardware accelerator chip.

6. A graphics system comprising:
   a raster pipe configured to operate on geometry data to generate samples;
   a direct path configured operate on pixel data;
   a convergence unit configured to merge a first data stream including samples from the raster pipe and a second data stream including the pixel data from the direct path, and to forward the merged data stream to a frame buffer, wherein the convergence unit is further configured to identify an occurrence of a token in the merged data stream and to store the token in a synchronization register, wherein the synchronization register is readable by an external processor;

a bus interface configured to receive a stream of data items from the external processor, and to send each of the data items to a selected one of the render pipe and the direct path;

a bus coupling the bus interface to the convergence unit, wherein the bus is configured to transfer contents of the synchronization register from the convergence unit to the bus interface in response to a read request initiated by the external processor.

7. The graphics system of claim 6, further comprising a blending unit configured to receive the merged data stream, and to blend pixels on the merged data stream based on corresponding pixel alpha values, and to blend samples in the merged data stream based on corresponding sample alpha values.

8. A method comprising:

a processor writing data $D_1$ to a first path in a hardware device;

the processor writing a first token to the first path, wherein said first token indicates an end of the data $D_1$, wherein the first token follows the data $D_1$ though the first path to a convergence unit in the hardware device, wherein the convergence unit is coupled to an output of the first path and an output of a second path in the hardware device;

the convergence unit receiving and storing the first token in a synchronization register in the hardware device;

the processor polling the synchronization register to determine when the first token arrives in the synchronization register;

the processor writing data $D_2$ to the second path in the hardware device in response to said polling determining that the first token has arrived in the synchronization register.

9. The method of claim 8, further comprising:

the processor writing the synchronization register with a known value prior to said writing the first token.

10. The method of claim 8, further comprising:

the processor writing a second token after writing the data $D_2$, wherein the second token follows the data $D_2$ through the second path to the convergence unit.

11. A method for synchronizing the operation of a plurality of pipelines in a hardware device, the method comprising:

a processor writing data $D_1$ to a first pipeline of the plurality of pipelines;

the processor writing a first token to the first pipeline, wherein said first token indicates an end of the data $D_1$, wherein the first token follows the data $D_1$ though the first pipeline to a convergence unit in the hardware device, wherein the convergence unit is coupled to an output of each of the pipelines of said plurality;

the convergence unit receiving and storing the first token in a synchronization register in the hardware device;

the processor polling the synchronization register to determine when the first token arrives in the synchronization register;

the processor writing data $D_2$ to any of the pipelines of said plurality after said polling determines that the first token has arrived in the synchronization register.

12. A graphics system comprising:

a raster pipe configured to operate on geometry data to generate samples;

a direct path configured operate on pixel data;

a convergence unit configured to merge a first data stream including samples from the raster pipe and a second data stream including the pixel data from the direct path, and to forward the merged data stream to a frame buffer, wherein the convergence unit is further configured to identify an occurrence of a token in the merged data stream and to store the token in a synchronization register, wherein the synchronization register is readable by an external processor;

wherein the convergence unit is a texture environment unit configured to apply texture values to pixels in a first texture operation mode.

* * * * *

UNITED STATES PATENT AND TRADEMARK OFFICE
CERTIFICATE OF CORRECTION

PATENT NO.    : 6,864,892 B2
DATED         : March 8, 2005
INVENTOR(S)   : Lavelle et al.

It is certified that error appears in the above-identified patent and that said Letters Patent is hereby corrected as shown below:

Column 12,
Line 43, please delete "devices" and substitute -- device;--.

Signed and Sealed this

Seventh Day of June, 2005

JON W. DUDAS
*Director of the United States Patent and Trademark Office*